US012237613B2

(12) United States Patent
Böcker et al.

(10) Patent No.: US 12,237,613 B2
(45) Date of Patent: Feb. 25, 2025

(54) PRINTED CIRCUIT BOARD PLUG CONNECTOR

(71) Applicant: Weidmüller Interface GmbH & Co. KG, Detmold (DE)

(72) Inventors: Marc Böcker, Steinheim (DE); Ralf Schumacher, Lemgo (DE); Peter Stuckmann, Lage (DE); Till Schmitz, Detmold (DE); Jens Oesterhaus, Detmold (DE); Jörg Münstermann, Schlangen (DE); Holger Wehmeier, Lemgo (DE); Volker Schröder, Lemgo (DE); Klaus Püschner, Detmold (DE)

(73) Assignee: Weidmüller Interface GmbH & Co. KG (DE)

( * ) Notice: Subject to any disclaimer, the term of this patent is extended or adjusted under 35 U.S.C. 154(b) by 846 days.

(21) Appl. No.: 17/446,859

(22) Filed: Sep. 3, 2021

(65) Prior Publication Data

US 2022/0077624 A1 Mar. 10, 2022

(30) Foreign Application Priority Data

Sep. 4, 2020 (DE) ......................... 102020123187.3

(51) Int. Cl.
*H01R 13/514* (2006.01)
*H01R 12/72* (2011.01)

(52) U.S. Cl.
CPC ......... *H01R 13/514* (2013.01); *H01R 12/722* (2013.01)

(58) Field of Classification Search
CPC .... H01R 13/64; H01R 13/514; H01R 13/518; H01R 12/72; H01R 12/722
USPC ...................................................... 439/79, 83
See application file for complete search history.

(56) References Cited

U.S. PATENT DOCUMENTS

| | | | | |
|---|---|---|---|---|
| 9,905,958 B2 | 2/2018 | Giefers | | |
| 2022/0077624 A1* | 3/2022 | Böcker | ................ | H01R 12/722 |

FOREIGN PATENT DOCUMENTS

| | | | |
|---|---|---|---|
| DE | 10100081 A1 | 7/2002 | |
| DE | 102007033942 A1 | 1/2009 | |
| DE | 10201405386 A1 | 10/2015 | |
| DE | 102018124322 A1 | 4/2020 | |

* cited by examiner

*Primary Examiner* — Khiem M Nguyen
(74) *Attorney, Agent, or Firm* — LAUBSCHER & FRETWELL, P.C.

(57) ABSTRACT

A terminal strip is formed as a printed circuit board plug connector and has a strip-like housing composed of a plurality of terminal housings which are arranged alongside one another in an arranging direction X. The housings are mechanically connected to one another. The terminal housings each have a plugging face side on which they have at least one first plugging contact which can be plugged together with a corresponding plugging contact of a corresponding plug connector.

16 Claims, 8 Drawing Sheets

FIG. 1A
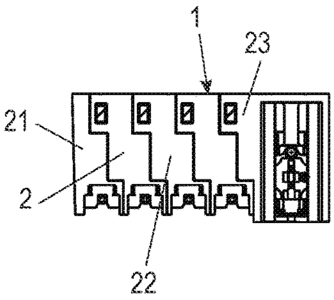
FIG. 1E
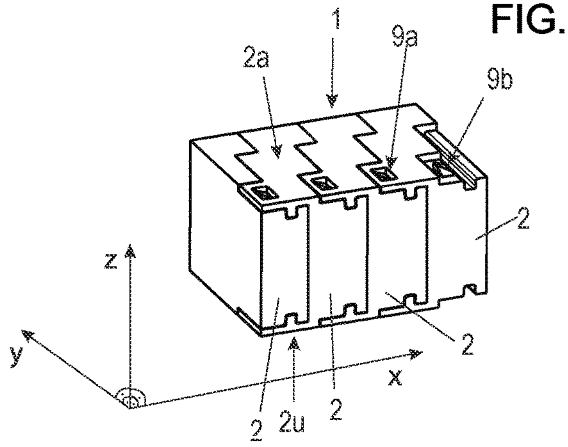
FIG. 1B
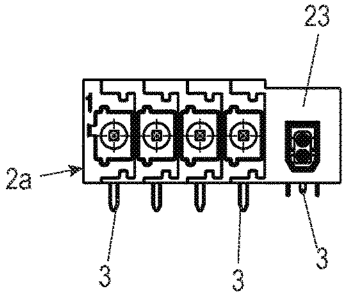
FIG. 1C
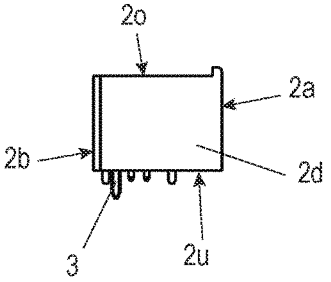
FIG. 1D
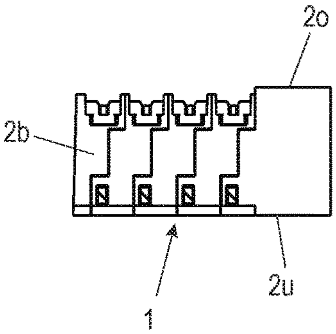
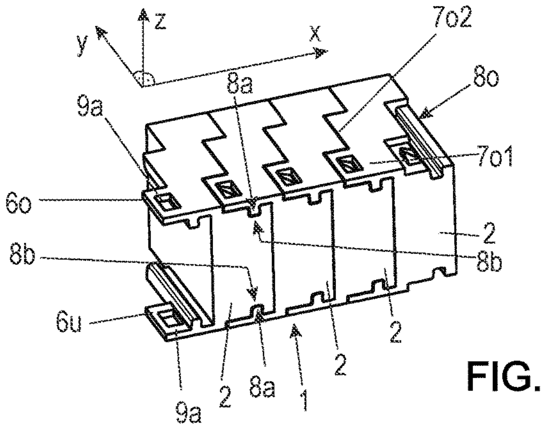
FIG. 1F

PRINTED CIRCUIT BOARD PLUG CONNECTOR

This application claims priority of DE 10 2020 123 187.3 filed Sep. 4, 2020, the entire contents of which are incorporated herein by reference.

BACKGROUND OF THE INVENTION

The invention relates to a terminal strip which is configured as a plug connector, in particular as a printed circuit board plug connector, and which has a strip-like housing.

An object of the invention is to create a possibility of adapting the terminal strip to various applications and intended purposes.

SUMMARY OF THE INVENTION

According to a primary object of the invention, a terminal strip is created. This is formed as a plug connector and preferably as a printed circuit board plug connector. It has a strip-like housing composed of a plurality of terminal housings which are arranged alongside one another in a first direction and are mechanically connected to one another. The terminal housings each have a plugging face side or surface on which they have at least one first plugging contact which can be plugged together with a corresponding plugging contact of a corresponding plug connector.

In this way, the terminal strip is configured in a simple manner as a module which can be adapted manner to a wide range of applications and intended purposes, by the number of plugging contacts which can be varied by varying the number of terminal housings.

The terminal housings are directly mechanically connected to one another via corresponding mechanical connectors including one or more locking hooks and corresponding locking traps or receptacles. The corresponding mechanical connectors can also include one or more clamping devices and corresponding counter-clamping devices such as pegs and holes other connection devices.

According to another object of the invention, the terminal strip is distinguished in that the connected terminal housings are respectively at least mechanically connected via corresponding mechanical connection as follows:

- a first of the terminal housings to be connected to one another in the first direction has two lugs, one of which protrudes in the elongation of an upper side and one of which protrudes in the elongation of an underside of the terminal housing in the direction of an adjacent further terminal housing, and
- the adjacent further terminal housing has, on the upper side and the underside, in each case a recess which corresponds to the lugs and in which the lugs of the adjacent first terminal housing engage in a form-fitting manner in the plugged-together state.

In this way, a simple and secure connection of the terminal housings which are arranged alongside one another is created which leads to proper seating of the terminal housings in the assembled terminal strip.

According to preferred embodiment, a tongue-and-groove connection is furthermore formed between one or both lugs and the corresponding recesses, and a locking connection is also formed between one or both lugs and the corresponding recesses.

In this way, a connection is produced between terminal housings arranged alongside one another which is simple to assemble and is particularly stable and in which the correct seating of the individual terminal housings in the terminal strip can be secured in multiple ways and in multiple directions.

The terminal housings are preferably substantially cubical and have an upper side, an underside and solder contact side, plugging face side, a rear side and two arranging sides.

According to a preferred embodiment, locking devices of the locking connection have a locking window on the lug or lugs and a corresponding locking projection on the recess or recesses.

A running bevelled surface for facilitating the locking process during assembly is formed on one or more of the respectively corresponding locking devices, in particular on the locking projection.

According to a further embodiment, the lugs and the recesses engage in a form-fitting manner in one another in the plane of the upper side or the underside in a stepped manner. In this way, a form fit is obtained in a simple manner particularly in the plugging direction.

The tongue-and-groove connection preferably extends in a plugging direction in which the terminal strip, which is like a plug connector, can be plugged together with a corresponding mating plug connector. In this way, the tongue-and-groove connection secures the terminal housings which are arranged alongside one another against being pulled apart perpendicularly to the plugging direction in the first direction.

The respective locking connection preferably additionally serves to secure the terminal housings which are arranged alongside one another against being pulled apart in and/or counter to the plugging direction.

In order to implement the tongue-and-groove connections, a tongue or a groove is formed on the underside of the upper lug and a groove or a tongue is formed on the corresponding upper side of the upper recess. Alternatively or in addition, a tongue or a groove is formed on the upper side of the lower lug and a groove or a tongue is formed on the corresponding underside or surface of the lower recess.

The terminal housings are designed to be placed at a contact side perpendicularly to the first direction onto a printed circuit board and connected in an electrically conductive manner to the printed circuit board in the region of one or more contacts. In this way, the respective terminal strip is configured in a simple manner as a printed circuit board plug connector. In order to connect the terminal strip to the printed circuit board, the contacts are configured as solder contacts which are soldered onto the printed circuit board or are soldered in the mounted state.

In this case, according to a first embodiment, the terminal strip has terminal housings with identical plugging faces.

However, it is also possible to create different terminal strips in which the terminal housings have only partially identical plugging faces and partially different plugging faces. However, in this case the connectors are preferably formed to be compatible.

At least one of the plugging faces in each case has a pin contact and/or a socket contact and/or a shielding contact.

BRIEF DESCRIPTION OF THE FIGURES

Other object and advantages of the subject invention will become apparent from a study of the accompanying drawing in which:

FIGS. 1A, 1B, 1C and 1D are top, front, side, and rear views, respectively of a first terminal strip;

FIG. 1E is a perspective view of the terminal strip in a partially arranged state;

FIG. 1F is a perspective view of an alternate embodiment of a terminal strip;

DETAILED DESCRIPTION

Figure 2A:
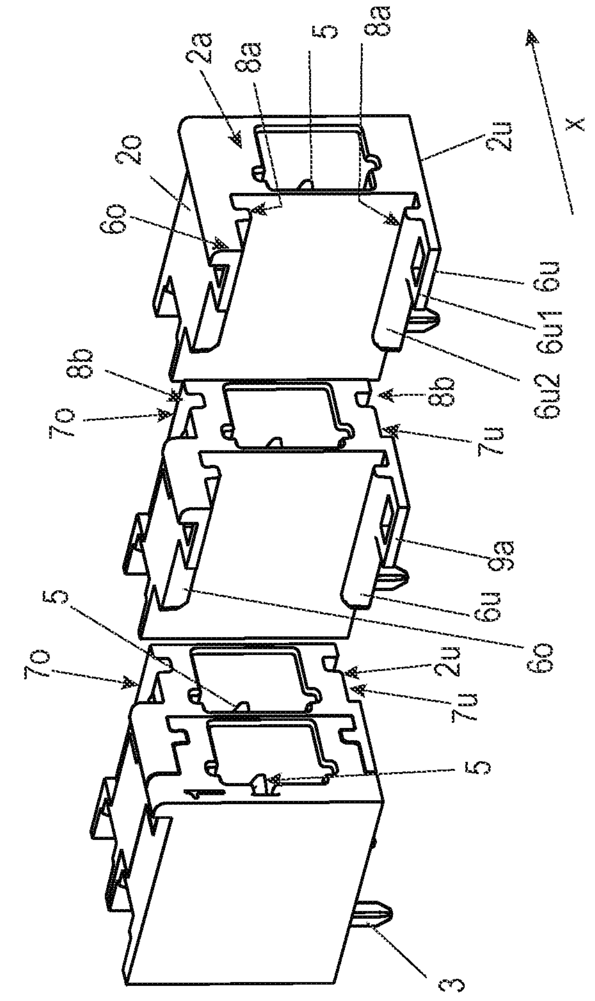
FIGS. 2A and 2B are perspective views, respectively, of several terminal housings during positioning to form a pin strip.

FIG. 1 shows a terminal strip 1 formed as a printed circuit board plug connector. Alternatively, the terminal strip can also be formed for use without a printed circuit board, for example for the connection of conductor ends, and can form part of a flying plug connector coupling.

The terminal strip 1 has a strip-like housing that is composed of a plurality of terminal housings 2 arranged alongside one another in a first arranging direction X.

The terminal strip 1 can exclusively have terminal housings 2 of identical design. However, it can also comprise terminal housings 2 of various designs.

In FIG. 1, the terminal strip 1 has at one of its ends a terminal housing 21 of a first design, several terminal housings 22 of a second design arranged alongside it, and a terminal housing 23 of a third design connected thereto.

However, strip of FIG. 1 should be understood to be merely an example. The terminal strip 1 can also exclusively have terminal housings 22 of only one or two or more than three designs of terminal housings. Terminal housings 2 of identical design are formed to be identical.

The terminal housings 21, 22, 23 have a substantially cubic basic shape with six outer sides. Adjacent outer sides of the terminal housings 2 are oriented at right angles or substantially at right angles to one another. In this case, the last terminal housing 23 is somewhat larger in two directions than the other terminal housings 21, 22. Each of the terminal housings must be configured at least on one side such that it can be arranged alongside an adjacent terminal housing 2. This requires an arranging side which is level in sections and connection devices for connecting to at least one adjacent terminal housing.

Deviations from the cubic shape will be explained in greater detail further below.

The terminal housings 21, 22, 23 of an identical design or different designs have corresponding or compatible connection devices in order to arrange them alongside one another and to mechanically connect them firmly to one another. These are also configured identically or at least compatibly even in the case of terminal housings 21, 22, 23 of various designs.

Figure 4A:
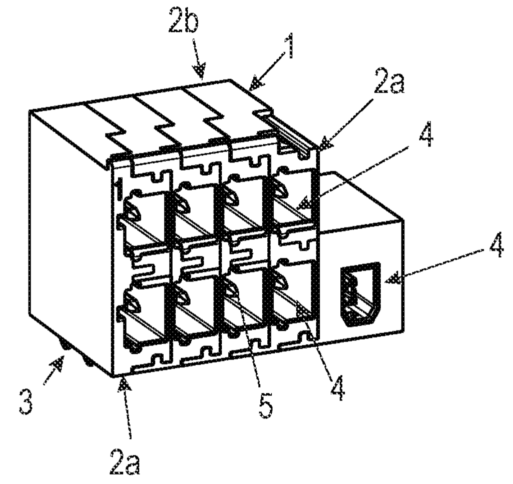
FIG. 4A is a perspective view of an alternate pin strip.
Figure 4B:
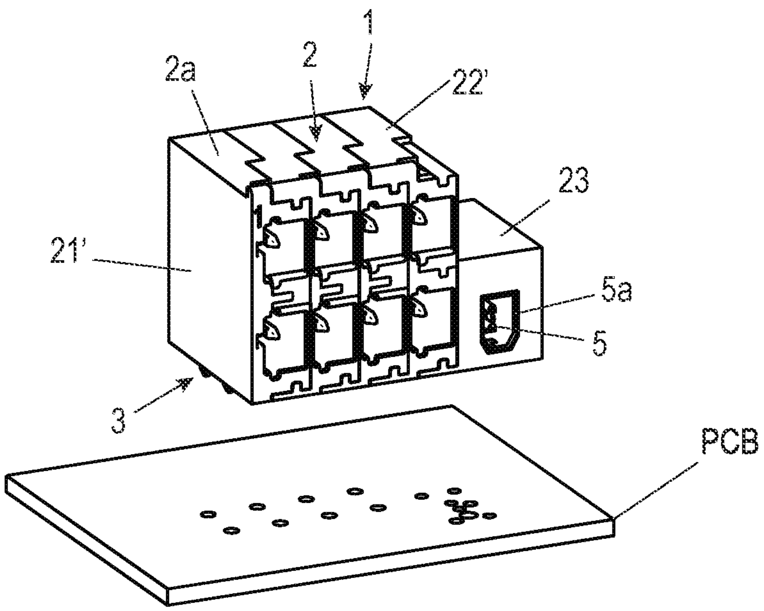
FIGS. 4B and 4C are perspective views of the pin strip of FIG. 4A before and after placement onto a printed circuit board, respectively.
Figure 4C:
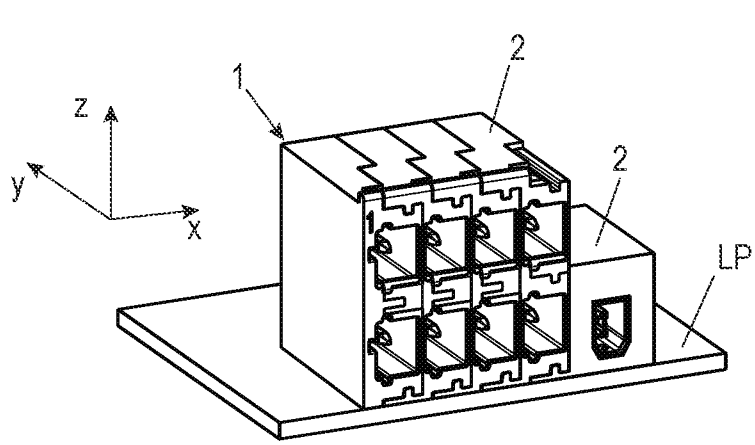

The terminal strip 1 is, or the terminal housings 2 thereof are, preferably designed to be placed on one of the sides thereof, i.e., on a contact side onto a printed circuit board (PCB) perpendicularly to the arranging direction X and to be connected in an electrically conductive manner in the region of one or more contacts as also shown in FIG. 4. The contact side 2*u* shall also be referred to as the underside. The side of the terminal housings 2 that is opposite the contact side shall also be referred to as the upper side 20.

The side walls of the terminal housings which are situated in the arranging direction X are also referred to as first and second arranging sides 2*c* and 2*d*.

Figure 5A:
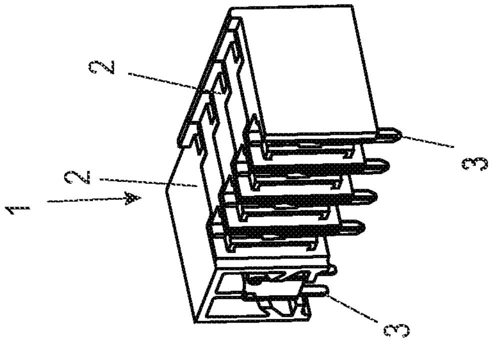
FIG. 5A is a perspective view of a terminal strip configured as a printed circuit board plug connector.
Figure 5B:
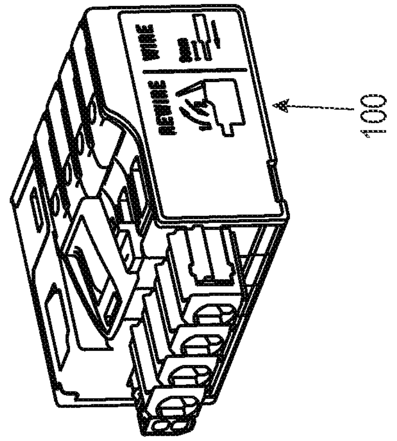
FIG. 5B is a perspective view of a mating plug connector before plugging-together.
Figure 5C:
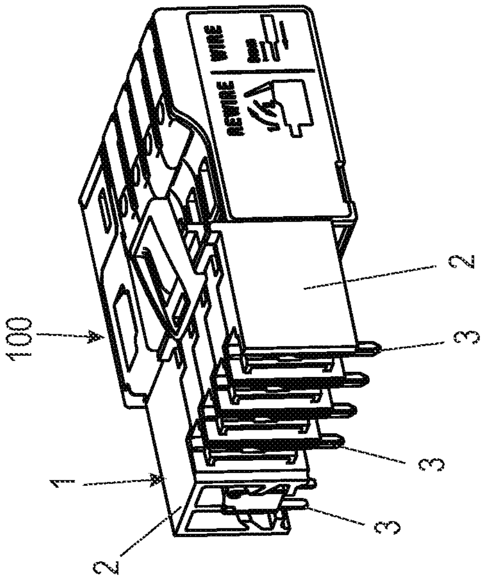
FIG. 5C is a perspective view of the plug connectors from FIGS. 5A and 5B in the plugged-together state.

The terminal housings 2 furthermore each have a plugging face side or surface 2*a* on which they have at least one first plugging contact which can be plugged together with a corresponding plugging contact of a corresponding plug connector 100 as shown in FIG. 5. The plugging face side or plug connector side is also referred to synonymously as the terminal side or front side, and the side of the terminal housings 2 that faces away from the terminal side 2*a* is also referred to as the rear side 2*b*. The corresponding plug connector 100 could also be designed for connection with a printed circuit board. A board-to-board connection (printed circuit board to printed circuit board) could then be performed via the plug connection.

The direction perpendicular to the arranging direction X, which runs from the underside 2*u* to the upper side 20, is denoted by Z and the further direction perpendicular to the arranging direction X and to the direction Z, which runs from the plug connector side 2*a* to the rear side 2R, is denoted as Y. The three directions X, Y, Z define a Cartesian coordinate system.

On the contact side 2*u*, one or more contacts, in particular solder contacts, can be formed on the terminal housing 2, and in particular they can protrude outwardly. The solder contacts can, by way of example, be formed as a pin contact 3 or as several pin contacts 3.

These pin contacts 3 on the contact side 2*u* can protrude outwardly such that they are inserted into apertures in a printed circuit board as shown in FIG. 4 and soldered. However, the solder contacts can be implemented in another design, i.e. as soldering surfaces or the like.

All or some of the terminal housings 2 are formed on the plug connector side or terminal side as a first plug connection for plugging together with a corresponding plug connection. This means that on this side they have on the plugging face side 2*a* a plugging face that is designed for plugging together with a corresponding plugging face of a corresponding plug connector 100 as shown in FIG. 5.

For this purpose, the terminal housings 2 can each have, on the plugging face side, for example, one or more apertures 4, which each define a chamber which is open on one side and into which one or more connecting contacts 5 are formed. These connecting contacts are formed in a preferred configuration as one or more pin contacts. The respective solder contact on the underside 2*u* and the associated plug contact, in particular a pin contact 5 on the plugging face side 2*a*, can be formed in one piece as a right-angled pin or a pin bent into an L-shape.

Blade contacts or tulip contacts can also be provided instead of pin contacts on the terminal or plug connector side 2*a*. Mixed forms of pin and tulip contacts are also possible as are shielding contacts 5*a* as shown for example in FIG. 2*b*.

The plugging face sides 2*a* individually form a plugging face and also in their interaction in the terminal strip 1 appropriately form a first overall plugging face of a first plug connector which can be plugged together with a corresponding second plug connector 100 with a corresponding plugging face as shown in FIG. 5. The plugging faces of the terminal housings 2 can wholly or partly be configured to be identical or different. The terminal housings 21, 22 of first and second designs have a uniform plugging face and the terminal housing 23 of a third design has a different plugging face with pin contacts 5 and with the shielding contact 5*a*. However, this is only an example. In this way, the terminal strip 1 can also be referred to as a hybrid terminal strip.

The plugging faces of the terminal housings of the terminal strip 1 can thus be configured differently. In this regard, a type of hybrid terminal strip with terminal housings 21, 22, 23 can even be formed with partially different connection technology which allows the connection of different mating plug connectors or the connection of an similarly constructed hybrid mating plug connector 100.

Corresponding connection devices are provided on the terminal housings in order to connect the terminal housings 21, 22, 23 of different designs to one another in the arranging direction X to form a stable, self-supporting terminal strip 1.

The connection devices have two lugs 60, 6*u* one of which protrudes in the elongation of the upper side 20 and one of which protrudes in the elongation of the underside 2*u* of the respective terminal housing counter to the arranging direction X or alternatively in the arranging direction X in the direction of an adjacent terminal housing 2.

The corresponding connection devices further have on the upper side 20 and the underside 2*u* a recess 70, 7*u* which corresponds to the lugs 60, 6*u* and in which the lugs 60, 6*u* of the adjacent terminal housings 2 to be connected in the arranging direction X engage.

In this case, the lugs 60, 6*u* and the corresponding recesses 70, 7*u* each extend in the plugging direction or Y direction, preferably not over the entire length of the terminal housings 2.

The lugs 60, 6*u* and the recesses 70, 7*u* furthermore each have two regions which have different lengths of extension counter to or in the arranging direction X.

Thus, in the region of the lugs 60, 6*u* and recesses 70, 7*u*, at least one step is achieved which leads to the terminal housings 2 arranged alongside one another being well secured in a form-fitting manner in the Z direction and in the plugging direction Y.

In the Z direction or upwards and downwards relative to the printed circuit board in the Y direction, the lugs 60, 6*u* and the recesses 70, 7*u* secure the terminal housings 2 of the terminal strip 1, which are arranged between them, against relative displacement in the terminal strip 1 group. In the plugging direction Y, the step leads in one direction relative to the form-fitting bearing.

Furthermore, in order to secure the terminal housings 2 relative to one another counter to the plugging direction and in the arranging direction X, corresponding tongue-and-groove connection devices 8*a*, 8*b*, and/or corresponding locking devices 9*a* and mating locking devices 9*b* are provided in the region of the lugs or bars 60, 6*u* and recesses 70, 7*u*. Preferably, both corresponding tongue-and-groove connection devices 8*a*, 8*b* and also corresponding locking devices 9*a* and mating locking devices 9*b* are provided.

According to a preferred embodiment, a tongue 8*a* or a groove is formed on the underside of the upper lug 60 and a groove 8*b* or a tongue is formed on the corresponding upper side of the upper recess 70. The tongue 8*a* and groove 8*b* preferably extend in the plugging direction Y.

Furthermore, a tongue 8*a* or a groove may be formed on the upper side of the lower lug 6*u* and a groove 8*b* or a tongue may be formed on the corresponding underside or surface of the lower recess 7*u*. The tongue 8*a* and groove 8*b* preferably extend in the plugging direction X direction.

As is clearly visible in FIG. 1*b* or FIG. 1*f*, this form fit secures adjacent terminal housings in the arranging direction because it secures them against being pulled apart parallel to the arranging direction X.

In this manner, during mounting of the terminal strip 1, adjacent terminal housings 2 can additionally be arranged alongside one another perpendicular to the arranging direction X in plugging direction Y simply by pushing them together so that the tongue-and-groove connections enter into engagement. The form fit secures adjacent terminal housings 2 against being pulled apart in or counter to the arranging direction as shown in FIGS. 2*a*, 2*g*, 3*a*, 3*b*, and 3*c*.

In addition, in order for the relative position of the terminal housings 2 in the terminal strip 1 to also be secured in the plugging direction Y, a supplementary locking connection is formed between the respective lug 60, 6*u* and the respective corresponding recess 70, 7*u*. This locking connection can be provided at the top or at the bottom of the housing on one or both of the bars. The respective lug 60, 6*u* and the respective recess 70, 7*u* can additionally have corresponding locking devices 9*a* and mating locking devices 9*b* for this purpose. It is preferred and simple if a locking window 9*a* is formed on the lug 60 and/or 6*u* for this purpose and if a corresponding projection 9*b* is provided in the cavity.

The locking connections also secure the terminal housings 2 which are arranged alongside one another against displacement in and counter to the plugging direction.

Figure 2B:
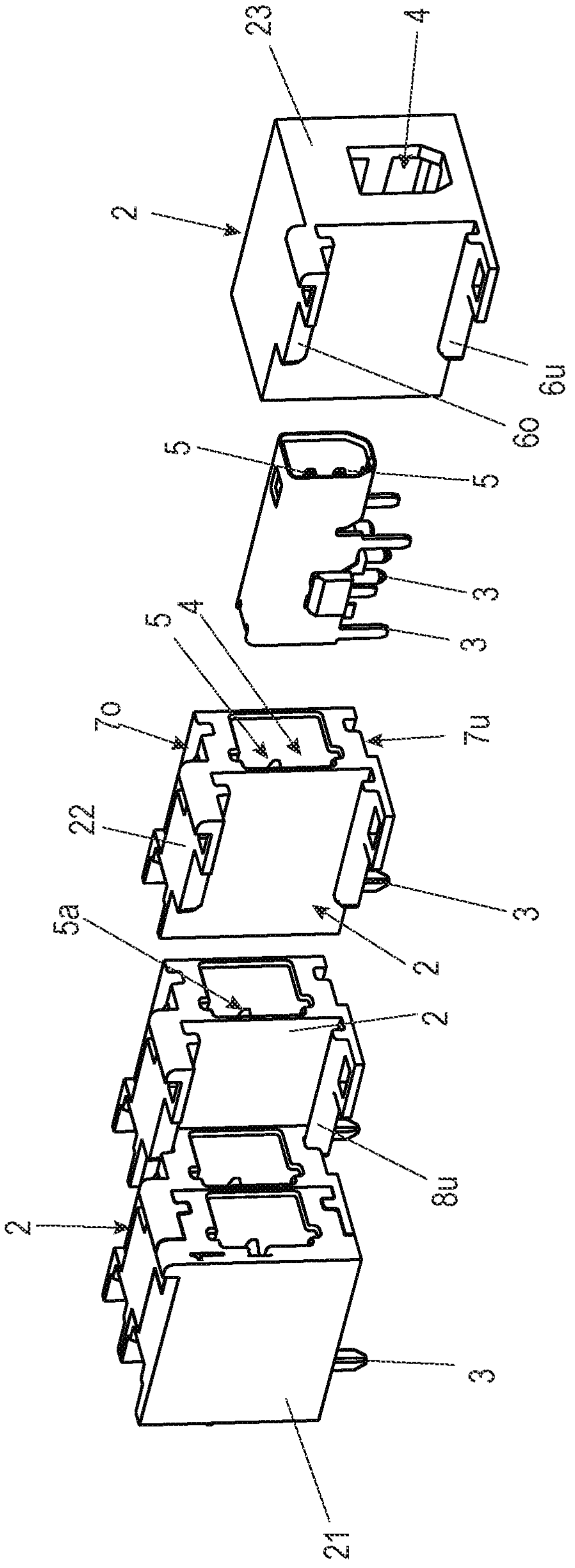
Figure 3A:
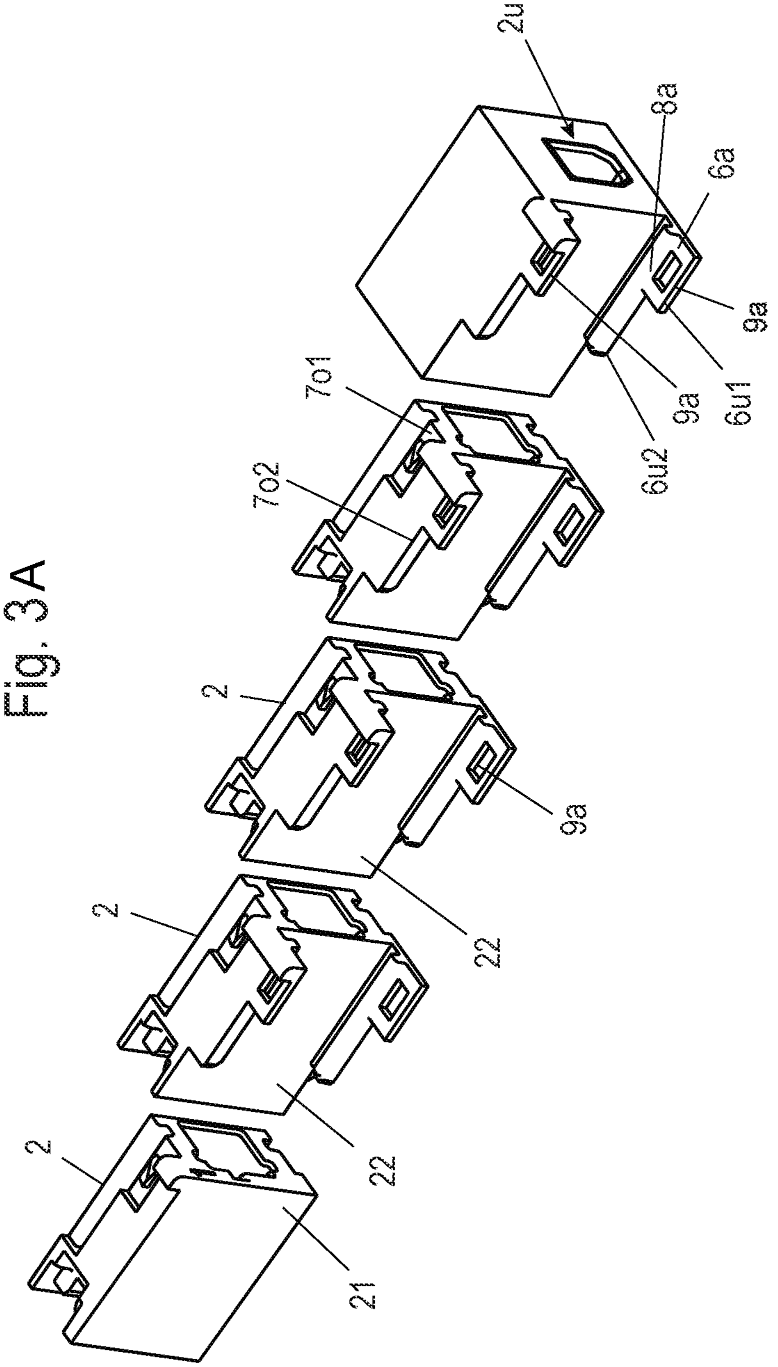
FIGS. 3A and 3B are perspective views of several terminal housings before and after positioning the housings alongside one another, respectively to form a pin strip.
Figure 3B:
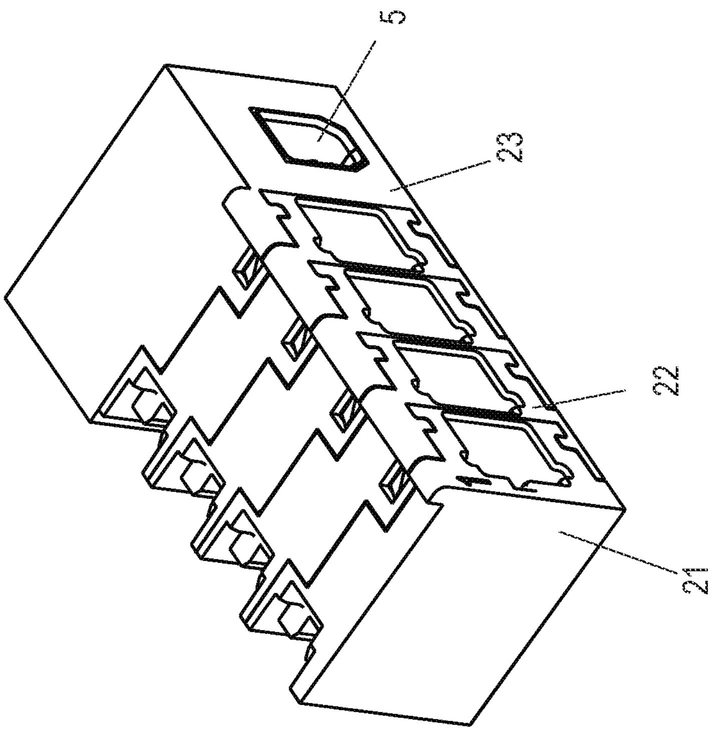
Figure 3C:
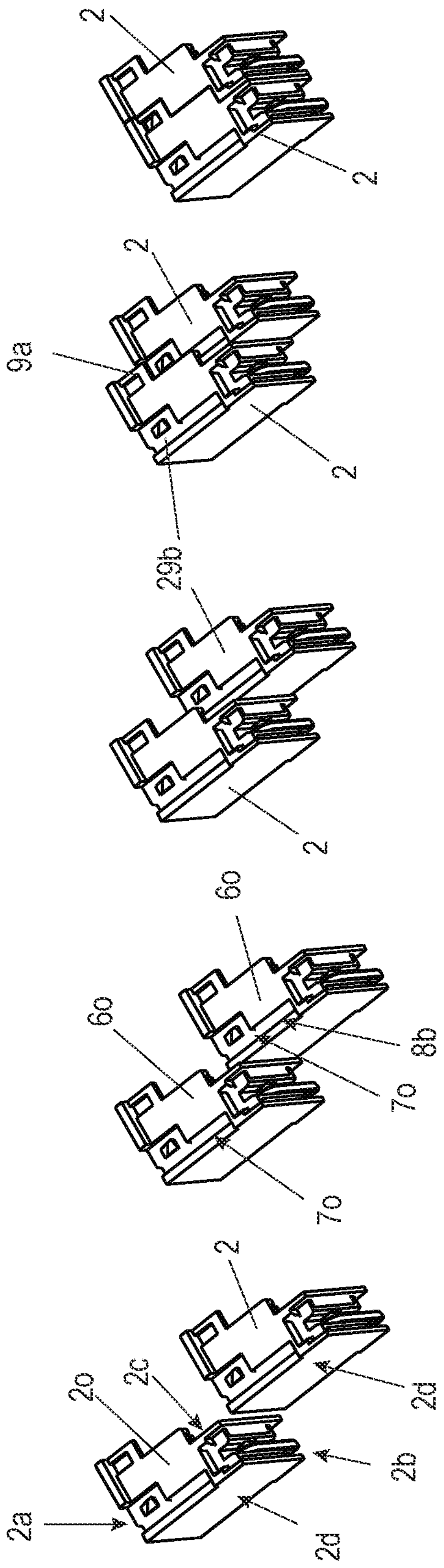
FIG. 3C shows the positioning of two terminal housings alongside one another in five consecutive steps.

At least one of the locking devices such as the projection or an edge at the bar with the window can be bevelled such that when adjacent terminal housings are pushed together at their tongue-and-groove connections, the lug 60, 6*u* is raised up at the running bevelled surface, such that it is bent up slightly until the projection 9*b* engages in the locking window 9*a* in a locking manner as shown in FIGS. 2*a* and 3*c*. In this case, the running bevelled surface can be formed on the locking projection 9*b* in the plugging direction Y and/or in the arranging direction X.

The terminal housings 2 are then secured against displacement relative to one another in and counter to the plugging direction Y.

Only lugs or recesses 60, 6*u*; 70, 7*u* are provided on the first and last terminal housings 21, 23 of the terminal strip 1 because the last terminal housings 2 of the terminal strip are arranged or have to be arranged only in one direction at an adjacent terminal housing 2.

According to FIG. 4, the terminal housings of the first and second designs, respectively, have two chambers 4 situated one above the other with plugging contacts, in particular pin contacts. In addition, these chambers can be directly formed in one-piece or multipiece terminal housings (e.g. above one another in the Z direction). These multilevel terminal housings can then have the above-described corresponding lugs 60, 6*u* and recesses 70, 7*u* for their connection. In this manner, one or more of the terminal housings 2 can have an individual plugging face or a double plugging face or multi-plugging face, e.g. a double-level multi-plugging face.

The invention claimed is:

1. A printed circuit board plug connector, comprising (a) a plurality of terminal housings arranged alongside and connected with one another in an arranging direction as a strip of housings, each of said housings including a plugging surface including at least one first plugging contact plugged together with a corresponding plugging contact of an adjacent terminal housing; and (b) mechanical connectors for connecting a first terminal housing with an adjacent second terminal housing, said mechanical connectors including (1) first and second lugs extending in said arranging direction from upper and lower surfaces, respectively, of said first terminal housing; and (2) first and second recesses arranged in upper and lower surfaces, respectively, of said second terminal housing for receiving said first and second lugs, respectively of said first terminal housing in a form-fitting manner when said first and second housings are plugged together.

2. The printed circuit board plug connector as defined in claim 1, wherein said first and second lugs and said first and second recesses form respective tongue-and-groove connections at least one which is a locking connection.

3. The printed circuit board plug connector as defined in claim 1, wherein said terminal housings have a cubical configuration including said upper and lower surfaces, said plugging surface, a rear surface, and two side surfaces.

4. The printed circuit board plug connector as defined in claim 2, wherein said locking connection includes a locking opening on at least one of said lugs and a corresponding locking projection corresponding with at least one of said recesses.

5. The printed circuit board plug connector as defined in claim 4, wherein said locking projection includes a beveled surface.

6. The printed circuit board plug connector as defined in claim 5, wherein said beveled surface is formed on said locking projection in at least one of a plugging direction and said arranging direction.

7. The printed circuit board plug connector as defined in claim 1, wherein said form-fitting connection between said lugs and said recesses has a stepped configuration.

8. The printed circuit board plug connector as defined in claim 2, wherein said tongue-and-groove connection extends in a plugging direction.

9. The printed circuit board plug connector as defined in claim 2, wherein one of a tongue and a groove is formed on an underside of said first lug and one of a groove and a tongue is formed on a corresponding upper side of said first recess and one of a tongue and a groove is formed on an upper side of said second lug and one of a groove and a tongue is formed on a corresponding underside of said second recess.

10. The printed circuit board plug connector as defined in claim 2, wherein only one of said lugs and recesses are formed on at least one of and end pair of said terminal housings.

11. The printed circuit board plug connector as defined in claim 3, wherein said terminal housing lower surfaces comprise a contact surface configured for mounting on a printed circuit board in a direction perpendicular to said arranging direction, said contact surface including at least one contact for electrical connection with said printed circuit board.

12. The printed circuit board plug connector as defined in claim 11, wherein said at least one contact comprises a solder contact.

13. The printed circuit board plug connector as defined in claim 1, wherein said terminal housings include identical plugging surfaces.

14. The printed circuit board plug connector as defined in claim 1, wherein said terminal housings have partially identical plugging surfaces and partially different plugging surfaces.

15. The printed circuit board plug connector as defined in claim 1, at least one of said plugging surfaces of said terminal housings includes a pin contact.

16. The printed circuit board plug connector as defined in claim 1, wherein at least one of said terminal housings includes a multiple plugging surface.

* * * * *